United States Patent [19]

Suzuki

[11] Patent Number: 5,315,327
[45] Date of Patent: May 24, 1994

[54] HIGH SCANNING RATE TO STANDARD SCANNING RATE TELEVISION SIGNAL CONVERTER WITH SMOOTH MOVING EDGE CONVERSION

[75] Inventor: Yoshinori Suzuki, Kanagawa, Japan

[73] Assignee: Sony Corporation, Tokyo, Japan

[21] Appl. No.: 884,388

[22] Filed: May 18, 1992

[30] Foreign Application Priority Data

| May 21, 1991 | [JP] | Japan | 3-144075 |
| May 21, 1991 | [JP] | Japan | 3-144076 |
| May 21, 1991 | [JP] | Japan | 3-144077 |

[51] Int. Cl.⁵ .............................. H04N 7/01
[52] U.S. Cl. ............................ 348/439; 348/440
[58] Field of Search .............. 358/140, 11, 12, 138, 358/133, 105; H04N 7/01, 5/782

[56] References Cited

U.S. PATENT DOCUMENTS

| 4,240,101 | 12/1980 | Michael et al. | 358/140 |
| 4,276,565 | 6/1981 | Dalton et al. | 358/140 |
| 4,672,442 | 6/1987 | Yamaguchi et al. | 358/140 |
| 4,774,599 | 9/1988 | Baumeister . | |
| 4,862,266 | 8/1989 | Gillard | 358/140 |
| 4,864,398 | 9/1989 | Avis et al. | 358/140 |
| 4,967,263 | 10/1990 | Dieterich | 358/140 |
| 5,103,308 | 4/1992 | Asano | 358/140 |
| 5,157,490 | 10/1992 | Kawi et al. | 358/140 |

FOREIGN PATENT DOCUMENTS

| 0120696 | 10/1984 | European Pat. Off. | H04N 5/782 |
| 0424654 | 5/1991 | European Pat. Off. . | |
| 2135850 | 9/1984 | United Kingdom | H04N 7/01 |

OTHER PUBLICATIONS

Patent Abstracts of Japan, vol. 12, No. 385 (E-668) 14 Oct. 1988 & JP-A-63 128 881 (Hitachi Medical Corp.) Jun. 1, 1988.

Patent Abstracts of Japan, vol. 6, No. 16 (E-92) 29 Jan. 1982 & JP-A-56 138 376 (NHK) 28 Oct. 1981.

Primary Examiner—James J. Groody
Assistant Examiner—Glenton B. Burgess
Attorney, Agent, or Firm—William S. Frommer; Alvin Sinderbrand

[57] ABSTRACT

Odd fields of a high speed television signal within even field intervals of a television signal having a reference frequency are readout from field memories 6, 7 with the time base of the odd fields being expanded. An arithmetical mean of the odd fields thus read out is taken by means of an adder 15 and a divider 16. The signal thus obtained is used as an odd field signal. Further, even fields of the high speed television signal within odd field intervals of the television signal having the reference frequency are read out from field memories 8, 9 with the time base of the even fields being expanded. An arithmetical mean of the even fields thus read out is taken by means of an adder 17 and a divider 18. The signal thus obtained is used as an even field signal.

6 Claims, 10 Drawing Sheets

HIGH SCANNING RATE TO STANDARD SCANNING RATE TELEVISION SIGNAL CONVERTER WITH SMOOTH MOVING EDGE CONVERSION

BACKGROUND OF THE INVENTION

1. Field of the Invention

This invention relates to a scanning rate converter for a television signal, which is adapted for converting a scanning rate to a scanning rate of 1/N to output it, and more particularly to a scanning rate converter adapted for generating a television signal of a reference frequency from a high speed television signal having a frequency N times greater than that of the reference frequency of a television signal in which odd and even fields are generated one after another in correspondence with respective intervals of even fields and odd fields of the television signal having the reference frequency, and the total number of the odd fields and even fields is equal to N (N is an odd number).

2. Description of The Prior Art

As for a television signal of the standard television system, a scanning period of one frame is prescribed. For example, in the case of the NTSC system, since the field frequency is 60 Hz, it is unable with a television camera of the NTSC system to capture a moving object varying at a speed higher than 1/60 sec. In view of this, as disclosed in the Japanese Laid Open Patent Application NO. 17292/84 publication, for example, there is provided a high speed actual or real image recorder in which a television camera having a scanning rate N times greater than that of the standard television system is used to pick up an object image to record, in a multi channel form, image pickup output signals into a video tape recorder.

In order to monitor, by using an image monitor, an image pickup output by a television camera having an N-tuple scanning rate used in such a high speed actual or real image recorder, it is necessary to use a special image monitor of the N-tuple scanning rate, or to use a scanning rate (speed) converter for converting a scanning rate of an image pickup output by the television camera to a scanning rate of the standard television system.

Meanwhile, the television camera is adapted to carry out an imaging operation synchronous with a reference television signal for external synchronization. With a television camera of the N-tuple scanning rate, a television signal of the N-tuple scanning rate is generated with the reference television signal as a reference. A scanning rate converter adapted for converting a scanning rate of an image pickup output by such a television camera of the N-tuple scanning rate to a scanning rate of the standard television system requires a reference television signal of a basic (standard) scanning rate. For this reason, an input terminal for a high speed television signal of the N-tuple scanning rate and an input terminal for a reference television signal of the basic scanning rate must be juxtaposed, disadvantageously resulting in an increased number of terminals for external connection.

Figure 1:
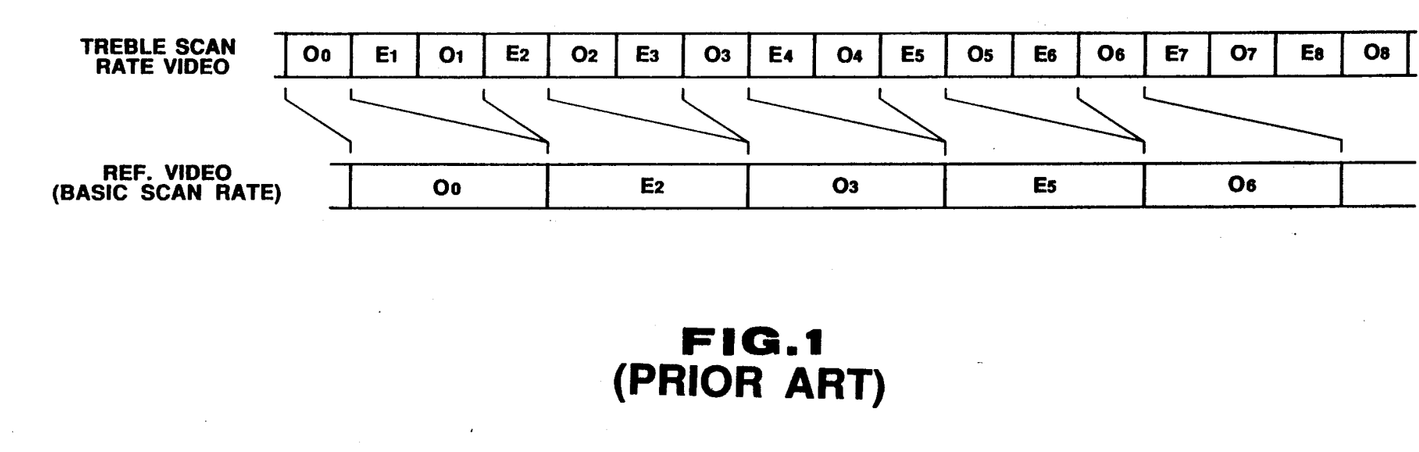
FIG. 1 is a timing chart for explaining the problem in the case where an approach is employed to expand three times the time base of image pickup outputs every three fields of image pickup outputs by a television camera of the treble scanning rate to use them as video signals of respective fields of a television signal of the standard television system.

Further, in the case of converting a scanning rate of an image pickup output by a television camera of the N-tuple scanning rate to a scanning rate of the standard television system, if a scheme is merely employed as shown in FIG. 1, for example, to expand three times the time base of image outputs every three fields of image pickup outputs by a television camera of the treble scanning rate to use them as video signals of respective fields of a television signal of the standard television system, there would occur, between respective fields, time differences corresponding to a time period of three fields in the television signal of the treble scanning rate. For this reason, there is the problem that the contour of a moving picture might take a form of stair-steps, or motion or movement of a picture might fail to be smooth.

OBJECTS AND SUMMARY OF THE INVENTION

With the above in view, an object of this invention is to provide a scanning rate converter for a television signal capable of converting a high speed television signal of an N-tuple scanning rate to a reference television signal of a basic scanning rate permitting movement or motion of a picture to be smooth.

Another object of this invention is to provide a scanning rate converter for a television signal free from inconveniences such that the contour of a moving picture may take a form of stair-steps.

A further object of this invention is to provide a scanning rate converter for a television signal capable of converting a scanning rate of an image pickup output by a television camera of an N-tuple scanning rate to a scanning rate of the standard television system without necessity of juxtaposing an input terminal for a high speed television signal of the N-tuple scanning rate and an input terminal for a reference television signal for external synchronization.

According to a first aspect of this invention, there is provided a scanning rate converter for a television signal, which is adapted to receive a high speed television signal having a frequency N times grater than that of a television signal having a reference frequency, in which odd fields and even fields are generated one after another in correspondence with respective intervals of the even fields and the odd fields of the television signal having the reference frequency, and the total number of the odd and even fields is equal to N (N is an odd number), to expand the time base of all the odd fields of the high speed television signal within a certain interval of the intervals thereafter to take an arithmetical mean thereof to generate a mean odd field signal, and to expand the time of all the even fields of the high speed television signal within the next interval thereafter to take an arithmetical mean thereof to generate a mean even field signal, thus to form the mean odd field signal and the mean even field signal in correspondence with the odd fields and the even fields of the television signal having the reference frequency, respectively.

Further, according to a second aspect of this invention, there is provided a scanning rate converter for a television signal, which is adapted to receive a high speed television signal having a frequency N times greater than that of a television signal having a reference frequency, in which odd fields and even fields are generated in correspondence with respective intervals of even fields and odd fields of the television signal having the reference frequency, and the total number of the odd fields and even fields is equal to N (N is an odd number) to expand the time base of signals of even fields and odd fields of the high television signal positioned across the boundary between even fields and odd fields of a television signal having the reference frequency, thus to generate a television signal having the reference frequency.

In addition, according to a third aspect of this invention, there is provided a scanning rate converter for a television signal, which is adapted to detect a marker signal generated at a period of a standard television signal inserted in a television signal having a scanning rate N (N is an odd number) times greater than that of the standard television signal to generate a memory control signal on the basis of the detected marker signal, thus to generate a television signal having a scanning rate equal to the scanning rate of the standard television signal by a memory subjected to write/read control by the memory control signal and adapted to expand the time base of the television signal having the N-tuple scanning rate. The marker signal may have a white level of 100%. Further, this marker signal may be inserted at a position corresponding to a vertical retrace interval of the standard television signal. Here, it is preferable from a practical point of view that N is equal to 3.

The above-described objects and other objects, and novel features of this invention will become apparent by reading the description based on the attached drawings and novel matters pointed out in the claims.

DETAILED DESCRIPTION OF THE PREFERRED EMBODIMENTS

A first embodiment of a scanning rate converter for a television signal according to this invention will now be described with reference to FIGS. 2 to 5.

Figure 2:
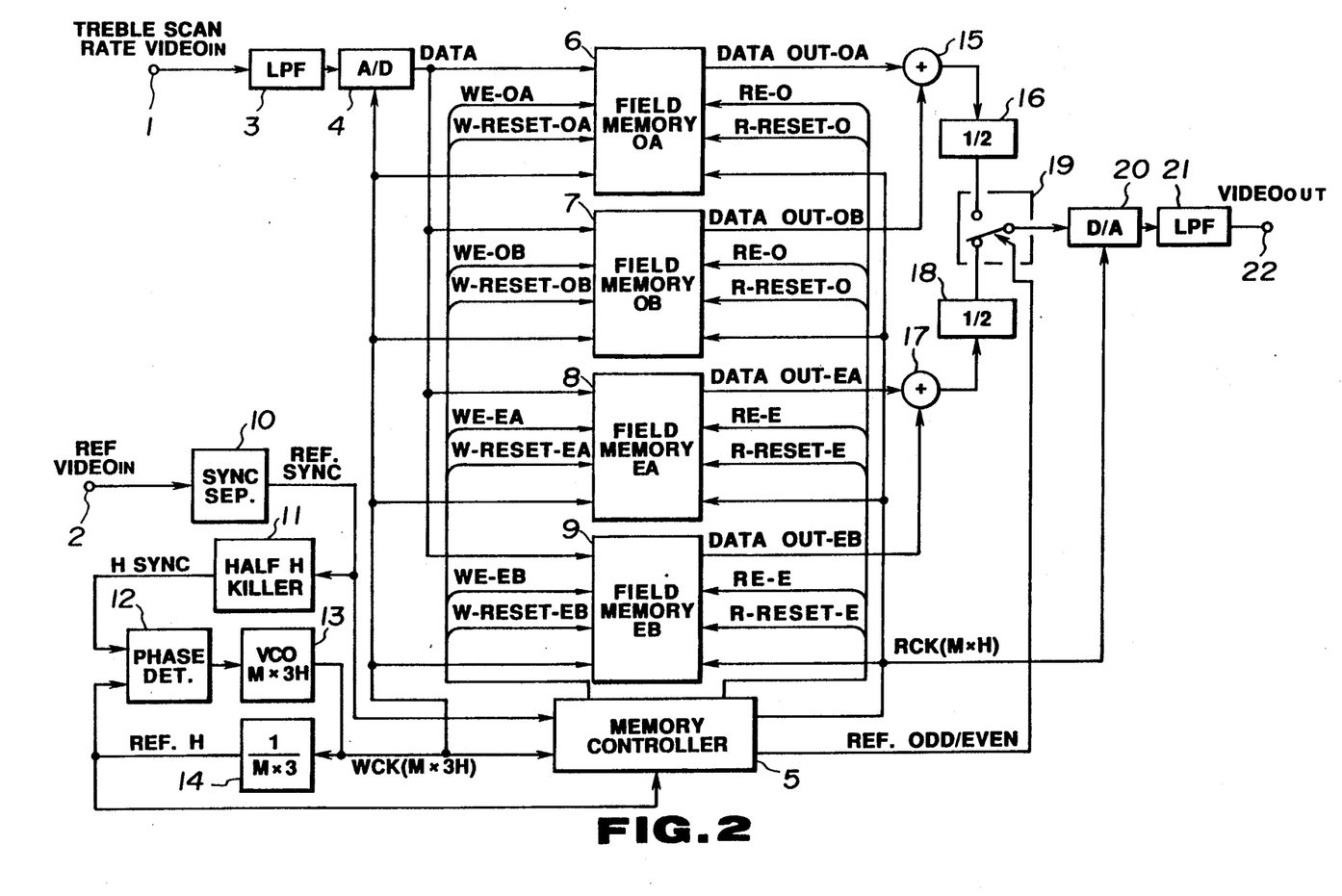
FIG. 2 is a block diagram showing an example of the configuration of a first embodiment of a scanning rate converter for a television signal according to this invention.

The scanning rate converter for a television signal shown in FIG. 2 is adapted for converting a television signal of the treble scanning rate obtained as an image pickup output by a television camera of the treble scanning rate to a scanning rate of the standard television system, and includes a first signal input terminal 1 supplied with a television signal ($VIDEO_{IN}$) of the treble scanning rate, and a second signal input terminal 2 supplied with a reference television signal (REF. $VIDEO_{IN}$) of the basic scanning rate.

In this scanning rate converter, the television signal ($VIDEO_{IN}$) of the treble scanning rate supplied to the first signal input terminal 1 is delivered to an analog-/digital (A/D) converter 4 through a low-pass filter 3 for preventing an aliasing distortion, at which it is converted to a signal in a digital form. Data (DATA) of the television signal of the treble scanning rate digitized by the A/D converter 4 is written into field memories 6, 7 of respective odd fields and field memories 8, 9 of respective even fields subjected to a write control and a readout control of data by a memory controller 5.

Further, the reference television signal (REF. $VIDEO_{IN}$) of the basic scanning rate delivered to the second signal input terminal 2 is delivered to a synchronous separation circuit 10, by which a reference synchronizing signal (REF. SYNC) is extracted. The reference synchronizing signal (REF. SYNC) extracted by the synchronous separation circuit 10 is delivered to the memory controller 5, and is also delivered to a phase comparator 12 through a half H killer circuit 11. The phase comparator 12 is supplied with a signal (REF. H) obtained by frequency-dividing an oscillation output of a voltage controlled oscillator (VCO) 13 by using a frequency divider 14, and serves to carry out phase comparison between the signal (REF. H) and a horizontal synchronizing signal (HSYNC) delivered from the half H killer circuit 11 to control an oscillation phase of the VCO 13 by a phase comparison output. Here, the phase comparator 12, the VCO 13 and the frequency-divider 14 constitute a well known phase locked loop (PLL).

The VCO 13 oscillates at a frequency of $3 \times M \times f_H$ where M represents the number of samples within one horizontal scanning period of the treble scanning rate television signal ($VIDEO_{IN}$), and $f_H$ represents a horizontal scanning frequency. The frequency-divider 14 frequency-divides an oscillation output of the VCO 13 by ($3 \times M$) to thereby form a signal (REF. H) of the horizontal scanning frequency $f_H$. An oscillation output of the VCO 13 is phase-locked to the horizontal synchronizing signal HSYNC of the reference signal (REF. $VIDEO_{IN}$) by the operation of the PLL. The oscillation output having the frequency of $3 \times M \times f_H$ obtained by the VCO 13 is delivered, as a write clock WCK, to the memory controller 5, the A/D converter 4, and the respective field memories 6, 7, 8, 9. Further, the signal (REF. H) of the horizontal frequency $f_H$ obtained by the frequency-divider 14 is also delivered to the memory controller 5.

Here, as the number of samples M within one horizontal scanning period of the treble scanning rate television signal ($VIDEO_{IN}$), 858 is adopted in the case of the NTSC system, and 864 is adopted in the case of the PAL system.

Figure 3:
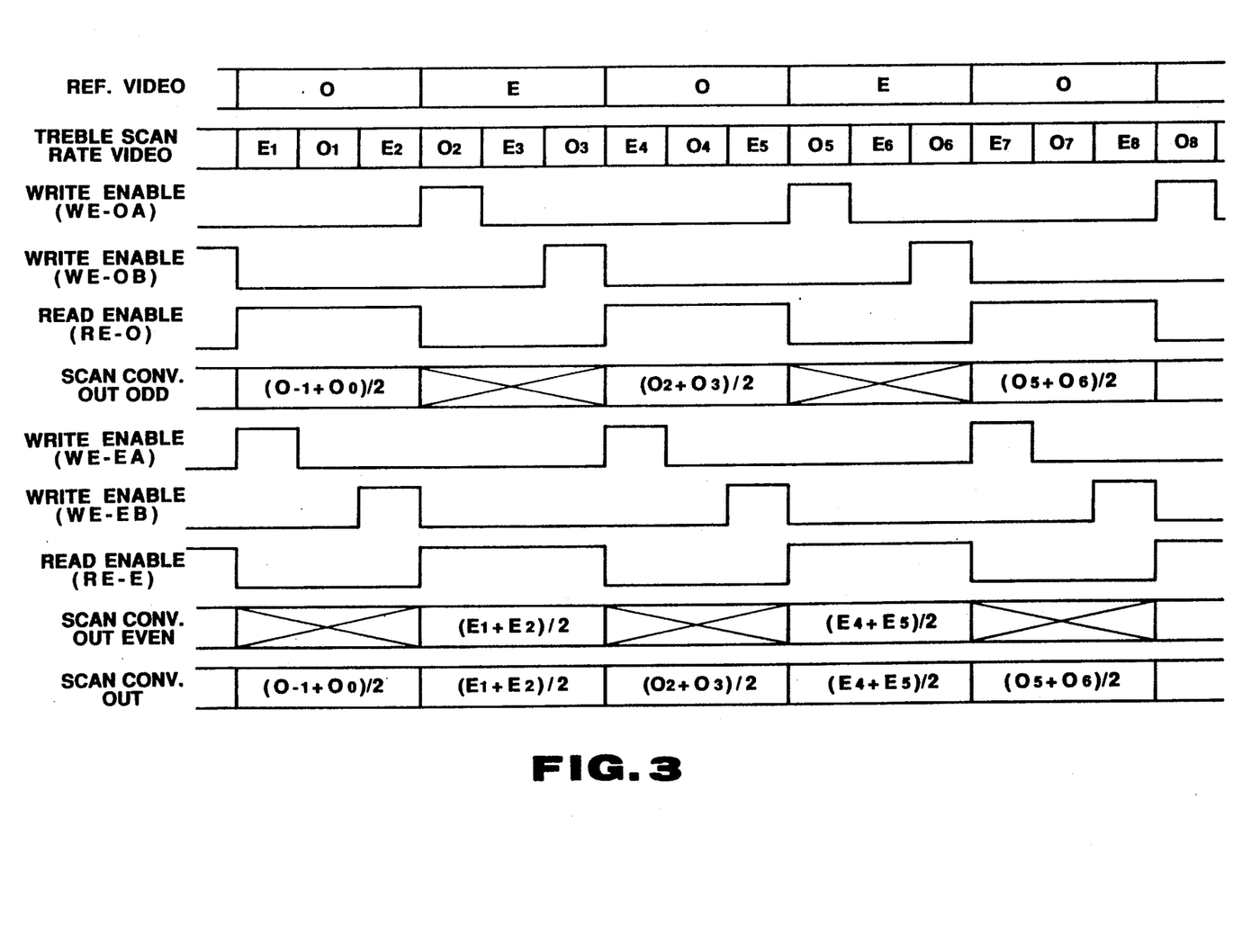
FIG. 3 is a timing chart showing the operation of the scanning rate converter shown in FIG. 1.

The memory controller 5 forms various control pulses (WE-OA, W-RESET-OA, WE-OB, W-RESET-OB, WE-EA, W-RESET-EA, WE-EB, W-RESET-EB) for a write control and various control pulses (RE-O, R-RESET-O, RE-E, R-RESET-E, RCK) for a readout control of the respective fields memories 6, 7, 8, 9, as shown in FIG. 3, on the basis of the reference synchronizing signal (REF. SYNC), the write clock (WCK) and the signal (REF. H) of the horizontal scanning frequency $f_H$, thus to control the respective field memories 6, 7, 8, 9.

The write enable pulses (WE-OA, WE-OB, WE-EA, WE-EA) of the various control pulses (WE-OA, W-RESET-OA, WE-OB, W-RESET-OB, WE-EA, W-RESET-EA, WE-EB, W-RESET-EB) for write control carry out a write operation of data for a time period of logic "H". The write enable pulse (WE-OA) is placed in the state of logic "H" for a time period corresponding to odd fields ($O_2$, $O_5$, $O_8$...) of the treble scanning rate television signal (VIDEO) existing at the initial end sides of respective even fields E of the reference television signal (REF. VIDEO). By this write enable pulse (WE-OA), data of the odd fields ($O_2$, $O_5$, $O_8$) ... of the treble scanning rate television signal (VIDEO) are written into the field memory 6. Further, the write enable pulse (WE-OB) is placed in the state of logic "H" for a time period corresponding to odd fields ($O_3$, $O_6$, $O_9$) ... of the treble scanning rate television signal (VIDEO) existing at the terminating end sides of respective even fields E of the reference television signal (REF. VIDEO). By this write enable pulse (WE-OB), data of the odd fields ($O_3$, $O_6$, $O_9$) ... of the treble scanning rate television signal (VIDEO) are written into the field memory 7. Further, the write enable pulse (WE-EA) is placed in the state of logic "H" for a time period corresponding to even fields ($E_1$, $E_4$, $E_7$) ... of the treble scanning rate television signal (VIDEO) existing at the initial end sides of respective odd fields 0 of the reference television signal (REF. VIDEO). By this write enable pulse (WE-EA), data of even fields ($E_1$, $E_4$, $E_7$) ... of the treble scanning rate television signal (VIDEO) are written into the field memory 8. Further, the write enable pulse (WE-EB) is placed in the state of logic "H" for a time period corresponding to even fields ($E_2$, $E_5$, $E_8$ ... ) of the treble scanning rate television signal (VIDEO) existing at the terminating end sides of respective odd fields O of the reference television signal (REF. VIDEO). By this write enable pulse (WE-EB), data of the even fields $E_2$, $E_5$, $E_8$ ... ) of the treble scanning rate television signal (VIDEO) are written into the field memory 9. In addition, write reset pulses (W-RESET-OA, W-REST-OB, W-RESET-EA, W-RESET-EB) of the various control pulses (WE-OA, W-RESET-OA, WE-OB, W-RESET-OB, WE-EA, W-RESET-EA, WE-EB, W-RESET-EB) for write control indicate leading positions of write addresses of respective data written by the write enable pulses (WE-0, WE-E).

Further, read enable pulses (RE-O, RE-E) of the various control pulses (RE-O, R-REST-O, RE-E, R-REST-E, RCK) for readout control carry out readout of data for a time period of logic "H". The read enable pulse (RE-0) is placed in the state of logic "H" corresponding to respective odd fields (0) of the reference television signal (REF. VIDEO). By this read enable pulse (RE-O), data ($O_2$, $O_5$, $O_8$... ) of odd fields are read out from the field memory 6 with the time base being expanded, and data ($O_3$, $O_6$, $O_9$... ) of odd fields are read out from the field memory 7 with the time base being expanded. Further, the read enable pulse (RE-E) is placed in the state of logic "H" for a time period corresponding to respective even fields (E) of the reference television signal (REF. VIDEO). By this read enable pulse (RF-E), data ($E_1$, $E_4$, $E_7$... ) of even fields are read out from the field memory 8 with the time base being expanded, and data ($E_2$, $E_5$, $E_8$ ... ) of even fields are read out from the field memory 9 with the time base being expanded. Furthermore, read reset pulses (R-RESET-O, R-RESET-E) of the various control pulses (RE-O, R-RESET-O, RE-E, R-RESET-E, RCK) for readout control indicate leading positions of readout addresses of respective data read out by the read enable pulses (RE-O, RE-E). In addition, the readout clock (RCK) of the various control pulses (RE-O, RE-E, R-RESET-O, R-RESET-E, RCK) for readout control is a ⅓ clock of the write clock (WCK).

For a time period of respective odd fields 0 of the reference television signal (REF. VIDEO), the data ($O_2$, $O_5$, $O_8$ ... ) of odd fields read out from the field memory 6 for odd fields with the time base being expanded, and the data ($O_3$, $O_6$, $O_9$ ... ) of odd fields read out from the field memory 7 with the time base being expanded are added at an adder 15. The added data ($O_2+O_3$, $O_5+O_6$, $O_8+O_9$, ...) are delivered to a divider 16. The divider 16 divides the added data ($O_2+O_3$, $O_5+O_6$, $O_8+O_9$, ...) from the adder 15 by "2" to thereby form field interpolation data $\{(O_2+O_3)/2, (O_5+O_6)/2, (O_8+O_9)/2 ...\}$. These field interpolation data $\{(O_2+O_3)/2, (O_5+O_6)/2, (O_8+O_9)/2 ...\}$ are delivered to a digital/analog (D/A) converter 20 through a changeover switch 19 as scanning rate converted odd field data (CONV. OUT$_{ODD}$), On the other hand, for a time period of respective even fields E of the reference television signal (REF. VIDEO), data ($E_1$, $E_4$, $E_7$ ... ) of even fields read out from the field memory 8 for even fields with the time base being expanded, and data ($E_2$, $E_5$, $E_8$ ... ) of even fields read out from the field memory 9 with the time base being expanded are added at an adder 17. The added data ($E_1+E_2$, $E_4+E$, $E_7+E_8$...) are delivered to a divider 18. The divider 18 divides the addes data ($E_1+E_2$, $E_4+E_5$, $E_7+E_8$ ... ) from the adder 17 by "2" to thereby form field interpolation data $\{(E_1+E_2)/2, (E+E_5)/2, (E_7+E_8)/2 ...\}$. These field interpolation data $\{(E_1+E_2)/2, (E_4+E_5)/2, (E_7+E_8)/2 ...\}$ are delivered to the D/A converter 20 through the changeover switch 19 as scanning rate converted even field data (CONV. OUT$_{EVEN}$).

The D/A converter 20 converts the scanning rate converted odd field data (CONV. OUT$_{ODD}$) and the scanning rate converted even field data (CONV. OUT$_{EVEN}$) sequentially delivered through the changeover switch 19 to data in an analog form to output scanning rate converted television signal (VIDEO$_{OUT}$) from output terminal 22 through an interpolating low-pass filter 21.

Since the scanning rate converted television signal (VIDEO$_{OUT}$) obtained at the output terminal 22 is a signal obtained by expanding the time base of the treble scanning rate television signal to further implement field interpolating processing thereto, there results a television signal of the basic scanning rate permitting movement or motion of a picture to be smooth.

Figure 4:
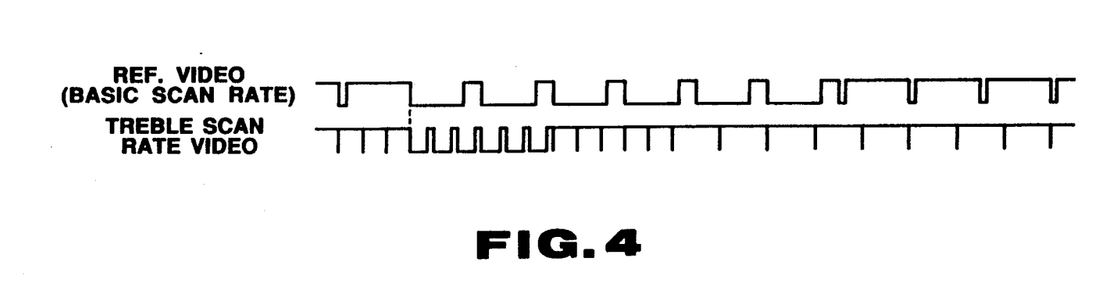
FIG. 4 is a waveform diagram showing, in an enlarged manner, synchronous waveforms in the vicinity of the vertical synchronization of television signals of the basic scanning rate and the treble scanning rate handled in a scanning rate converter of the NTSC system.
Figure 5:
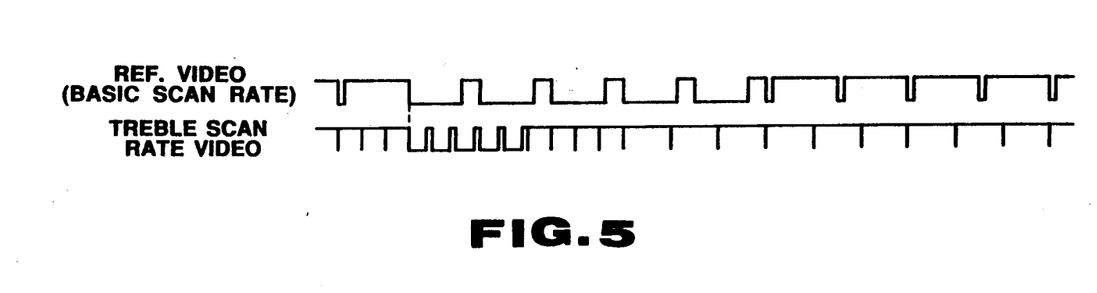
FIG. 5 is a waveform diagram showing, in an enlarged manner, synchronous waveforms in the vicinity of the vertical synchronization of television signals of the basic scanning rate and the treble scanning rate handled in a scanning rate converter of the PAL system.

It is to be noted that synchronous waveforms in the vicinity of vertical synchronization of television signals of the basic scanning rate and the treble scanning rate handled in the scanning rate converter of the NTSC system are shown in an enlarged manner in FIG. 4, and synchronous waveforms in the vicinity of vertical synchronization of television signals of the basic scanning rate and the treble scanning rate handled in the scanning rate converter of the PAL system are shown in an enlarged manner in FIG. 5.

In the scanning rate converter constructed as above, field interpolated data $\{(O_2+O_3)/2, (O_5+O_6)/2, (O_8+O_9)/2 ...\}$ obtained by expanding the time base of data of odd fields ($O_2, O_3, O_5, O_6, O_8, O_9 ...$) of the treble scanning rate television signal existing for a time period of even fields E of the reference television signal (REF. VIDEO) are caused to be scanning rate converted odd field data (CONV. OUT$_{ODD}$), and field interpolated data $\{(E_1+E_2)/2, (E_4+E_5)/2, (E_7+E_8)/2 ...\}$ obtained by expanding the time base of data of even fields ($E_1, E_2, E_4, E_5, E_7, E_8 ...$) of the treble scanning rate television signal (REF. VIDEO) existing for a time period of odd fields O of the reference television signal (REF. VIDEO) to further implement field interpolating processing thereto are caused to be scanning rate converted television signal (VIDEO$_{OUT}$). Accordingly, a memory capacity required for the field interpolating processing can become minimum. In addition, this scanning rate converter can convert a high speed television signal to a basic scanning rate television signal preceding by ½ of the vertical synchronization period at maximum with respect to vertical synchronization of the reference television signal. Accordingly, also in the case of allowing such high speed television signal to be passed through a time base correction circuit included in a video tape recorder, for example, it is possible to cope with delay by such a time base correction circuit.

As stated above, in the scanning rate converter for a television signal according to the first embodiment of this invention, a technique is employed to expand the time base of all odd fields of a high speed television signal within even field intervals of a television signal having a reference frequency to take an arithmetical mean thereof to generate a mean odd field signal, and to expand the time base of all even fields of the high speed television signal within odd field intervals of the television signal having the reference frequency to take an arithmetical mean thereof to generate a mean even field signal, thus to allow the mean odd field signal and the mean even field signal to be signals in correspondence with odd fields and even fields of the television signal having the reference frequency, respectively. Thus, it is possible to form, from the high speed television signal, a television signal having reference frequency, which permits movement or motion of a picture to be smooth.

Accordingly, in accordance with the first embodiment of this invention, it is possible to provide a scanning rate converter for a television signal, which can convert a high speed television signal of the N-tuple scanning rate to a television signal of the basic scanning rate permitting movement or motion of a picture to be smooth.

A second embodiment of a scanning rate converter for a television signal according to this invention will now be described with reference to FIGS. 6 and 7.

Figure 6:
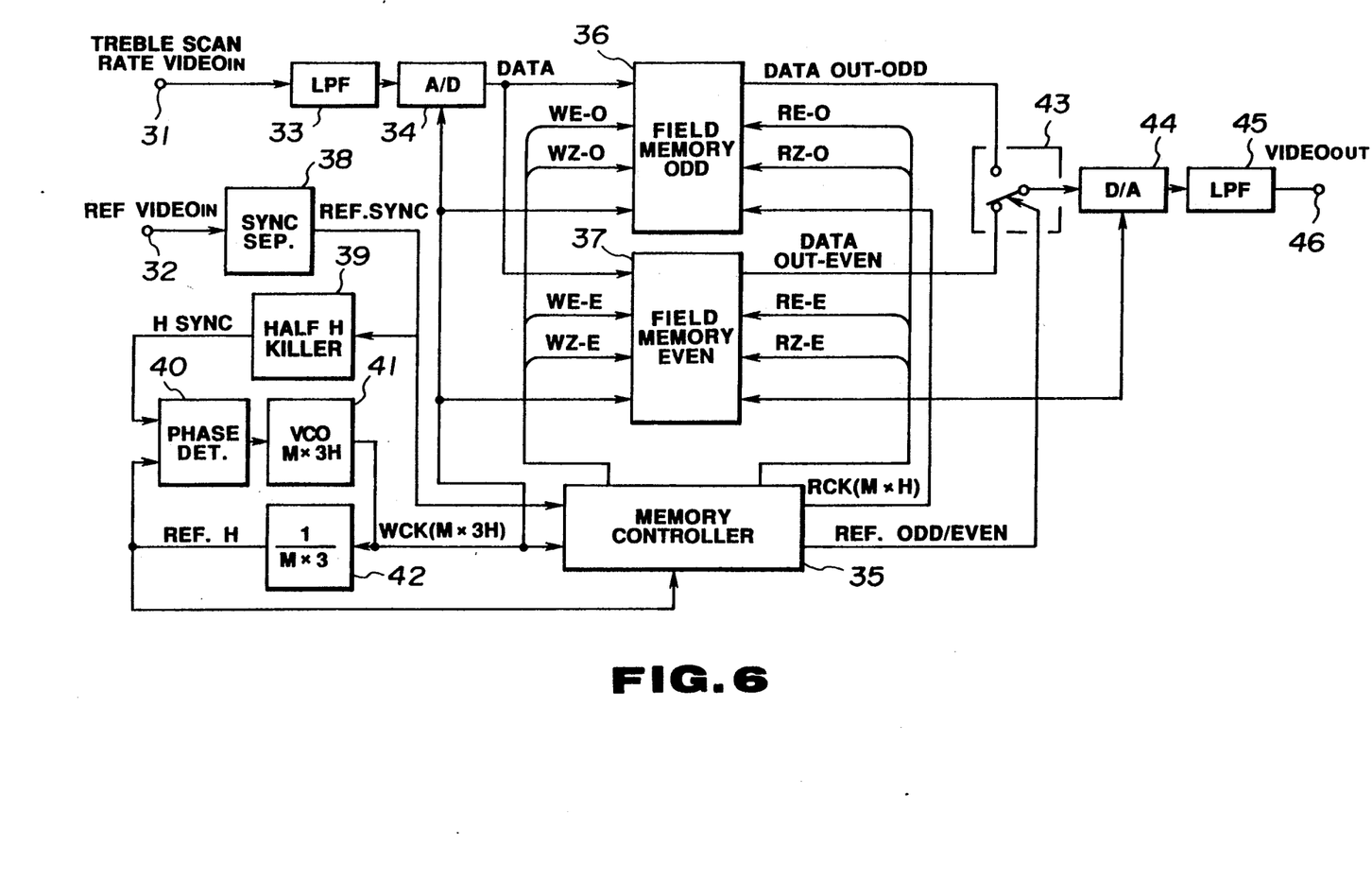
FIG. 6 is a block diagram showing an example of the configuration of a second embodiment of a scanning rate converter for a television signal according to this invention.

The scanning rate converter for a television signal shown in FIG. 6 is adapted for converting a treble scanning rate television signal obtained as an image pickup output by a treble scanning rate television camera to a scanning rate of the standard television system, and includes a first signal input terminal 31 supplied with a treble scanning rate television signal (VIDEO$_{IN}$), and a second signal input terminal 32 supplied with a basic scanning rate reference television signal (REF. VIDEO$_{IN}$).

In this scanning rate converter, the treble scanning rate television signal (VIDEO$_{IN}$) supplied to the first signal input terminal 31 is delivered to an analog/digital (A/D) converter 34 through a low-pass filter 33 for preventing an aliasing distortion, at which it is converted to a signal in a digital form. Data (DATA) of the treble scanning rate television signal digitized by the A/D converter 34 is written into a field memory 36 for respective odd fields and a field memory 37 for respective even fields subjected to a write control and a readout control of data by a memory controller 35.

Further, the basic scanning rate reference television signal (REF. VIDEO$_{IN}$) supplied to the second signal input terminal 32 is delivered to a synchronous separation circuit 38, by which a reference synchronizing signal (REF. SYNC) is extracted. The reference synchronizing signal (REF. SYNC) extracted by the synchronous separation circuit 38 is delivered to the memory controller 35, and is also delivered to a phase comparator 40 through a half H killer circuit 39. The phase comparator 40 is supplied with a signal (REF. H) obtained by frequency-dividing an oscillation output of a voltage controlled oscillator (VCO) 41 by using a frequency divider 42, and serves to carry out phase comparison between the signal (REF. H) and a horizontal synchronizing signal (HSYNC) delivered from the half H killer circuit 39 to control an oscillation phase of the VCO 41 by a phase comparison output. Here, the phase comparator 40, the VCO 41 and the frequency-divider 42 constitutes a well known phase locked loop (PLL).

The VCO 41 oscillates at a frequency of $3 \times M \times f_H$ where M represents the number of samples within one horizontal scanning period of the treble scanning rate television signal (VIDEO$_{IN}$), and $f_H$ represents a horizontal scanning frequency. The frequency-divider 42 frequency-divides an oscillation output of the VCO 41 by ($3 \times M$) to thereby form a signal (REF. H) of the horizontal scanning frequency $f_H$. An oscillation output of the VCO 41 is phase-locked to the horizontal synchronizing signal (HSYNC) of the reference television signal (REF. VIDEO$_{IN}$) by the operation of the PLL. The oscillation output having the frequency of $3 \times M \times f_H$ obtained by the VCO 41 is delivered, as a write clock WCK, to the memory controller 35, the A/D converter 34, and the respective field memories 36, 37. Further, the signal (REF. H) of the horizontal frequency $f_H$ obtained by the frequency-divider 42 is also delivered to the memory controller 35.

Here, as the number of samples M within one horizontal scanning period of the treble scanning rate television signal (VIDEO$_{IN}$), 858 is adopted in the case of the NTSC system, and 864 is adopted in the case of the PAL system.

Figure 7:
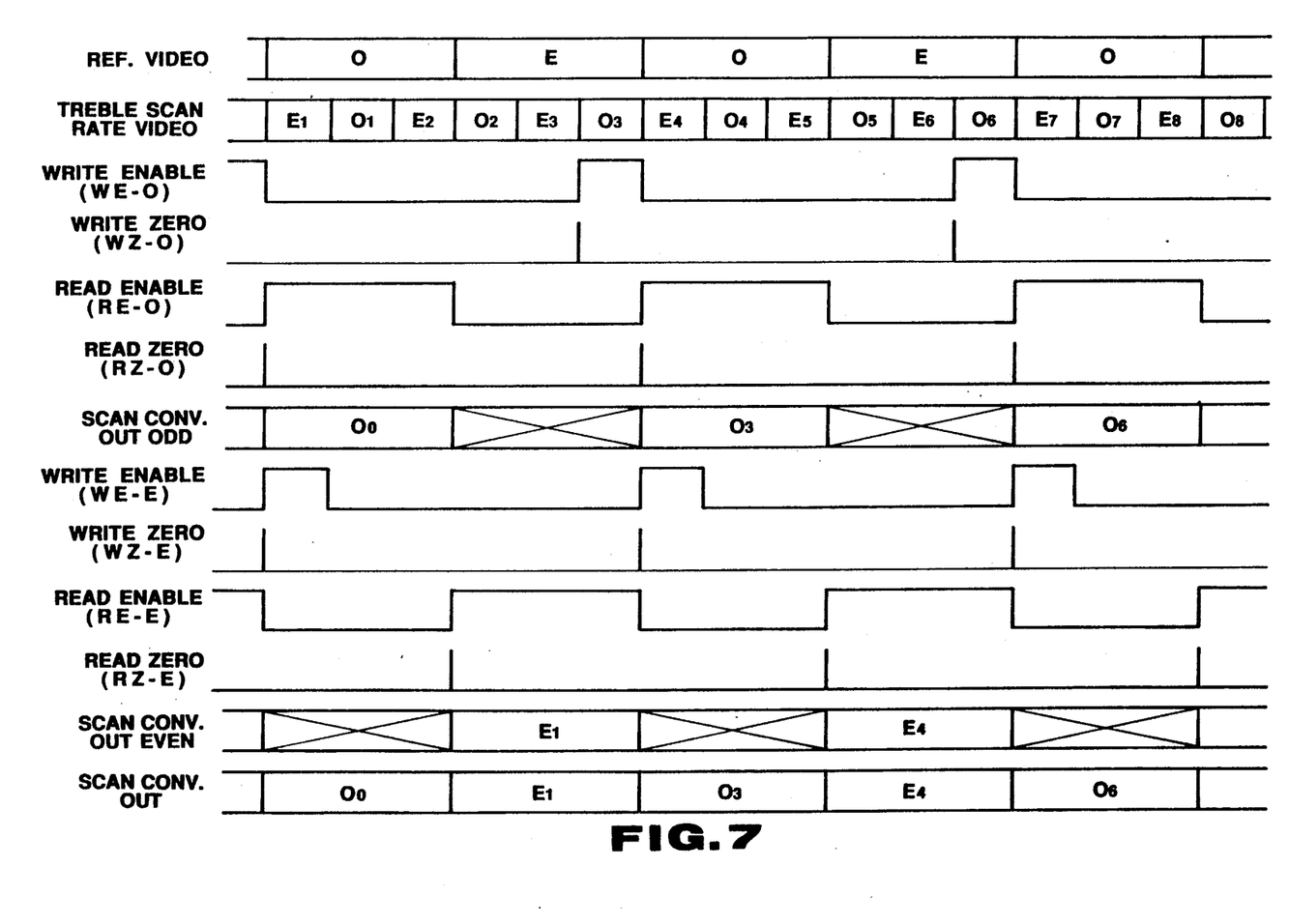
FIG. 7 is a timing chart showing the operation of the scanning rate converter shown in FIG. 6.

The memory controller 35 forms various control pulses (WE-0, WE-E, WZ-O, WZ-E), for a write control and various control pulses (RE-O, RE-E, RZ-O, RZ-E, RCK) for a readout control of the respective field memories 36 and 37, as shown in FIG. 7, on the basis of the reference synchronizing signal (REF. SYNC), the write clock (WCK) and the signal (REF.

H) of the horizontal scanning frequency $f_H$, thus to control the respective field memories 36, 37.

The write enable pulses (WE-0, WE-E) of the various control pulses (WE-O, WE-E, WZ-O, WZ-E) for write control carry out a write operation of data for a time period of logic "H". The write enable pulse (WE-0) is placed in the state of logic "H" for a time period corresponding to odd fields ($O_0$, $O_3$, $O_6$ ... ) of the treble scanning rate television signal (VIDEO) existing at the terminating end sides of respective even fields E of the reference television signal (REF. VIDEO). Further, the write enable pulse (WE-E) is placed in the state of logic "H" for a time period corresponding to even fields ($E_1$, $E_4$, $E_7$ ... ) of the treble scanning rate television signal (VIDEO) existing at the initial end sides of respective odd fields O of the reference television signal (REF. VIDEO). In addition, write zero pulses (WZ-O, WZ-E) of the various control pulses (WE-O, WE-E, WZ-O, WZ-E) for write control indicate the leading positions of write addresses of respective data written by the write enable pulses (WE-O, WE-E).

Further, the read enable pulses (RE-0, RE-E) of the various control pulses (RE-O, RE-E, RZ-O, RZ-E, RCK) for readout control carry out readout of data for a time period of logic "H". The read enable pulse (RE-O) is placed in the state of logic "H" corresponding to respective odd fields 0 of the reference television signal (REF. VIDEO). Further, the read enable pulse (RE-E) is placed in the state of logic "H" corresponding to respective even fields (E) of the reference television signal (REF. VIDEO). Furthermore, the read zero pulses (RZ-0, RZ-E) of the various control pulses (RE-0, RE-E, RZ-0, RZ-E, RCK) for readout control indicate the leading positions of readout addresses of respective data read out by the read enable pulses (RE-0, RE-E). In addition, the readout clock (RCK) of the various control pulses (RE-0, RE-E, RZ-0, RZ-E, RCK) for readout control is a $\frac{1}{3}$ of the write clock.

Data write/read operation of the field memory 36 for odd fields is as follows. Under a write control and a readout control of data carried out by the control pulses (WE-0, WZ-0) for write control and the control pulses (RE-0, RZ-0) for readout control, data of odd fields ($O_0$, $O_3$, $O_6$ ...) of the treble scanning rate television signal (VIDEO) existing at the terminating end sides of respective even fields E of the reference television signal (REF. VIDEO) are written into the field memory 36, and data of these odd fields ($O_0$, $O_3$, $O_6$ ... ) are read out from the field memory 36 with the time base being expanded for a time period of respective odd fields 0 of the reference television signal (REF. VIDEO). The data thus read out are delivered as scanning rate converted odd field data (CONV. OUT$_{ODD}$) to a digital-/analog (D/A) converter 44 through a changeover switch 43.

Further, data write/read operation of the field memory 37 for even fields is as follows. Under a write control and a readout control of data carried out by the control pulses (WE-E, WZ-E) for write control and the control pulses (RE-E, RZ-E) for readout control, data of even fields ($E_1$, $E_4$, $E_7$ ...) of the treble scanning rate television signal (REF. VIDEO) existing at the initial end sides of respective odd fields 0 of the reference television signal (REF. VIDEO) are written into the field memory 37, and data of these even fields ($E_1$, $E_4$, $E_7$ ... ) are read out from the field memory 37 with the time base being expanded for a time period of respective even fields E of the reference television signal (REF. VIDEO). The data thus read out is delivered as scanning rate converted even field data (CONV. OUT$_{EVEN}$) to the D/A converter 44 through the changeover switch 43.

The D/A converter 44 converts scanning rate converted odd field data (CONV. OUT$_{ODD}$) and even field data (CONV. OUT$_{EVEN}$) sequentially delivered through the changeover switch 34 to data in an analog form to output a scanning rate converted television signal (VIDEO$_{OUT}$) from output terminal 45 through an interpolating low-pass filter 44.

Since the scanning rate converted television signal (VIDEO$_{OUT}$) obtained at the output terminal 45 is a signal obtained by expanding the time base of data of successive two fields ($O_0$, $E_1$, $O_3$, $E_4$ ... ) of the treble scanning rate television signal (VIDEO), data of odd fields and data of even fields constituting respective frames are successive in time, resulting in no possibility that the contour of a moving picture takes a stair-step.

As stated above, in the scanning rate converter for a television signal of the second embodiment according to this invention, an approach is employed to expand the time base of signals of even fields and odd fields of a high speed television signal positioned across the boundary between even fields and odd fields of a television signal having a reference frequency, thus to generate a television signal of the reference frequency. Thus, data of odd fields and data of even fields constituting respective frames are successive in time, resulting in no possibility that the contour of a moving picture may take a form of stair-steps.

Accordingly, in accordance with the second embodiment of this invention, it is possible to provide a scanning rate converter adapted for converting a television signal of odd (N)-tuple scanning rate to a television signal having a reference frequency of the basic scanning rate with no possibility that the contour of a moving picture may take a form of stair-steps.

A third embodiment of a scanning rate converter for a television signal according to this invention will now be described with reference to FIGS. 8 to 11.

Figure 8:
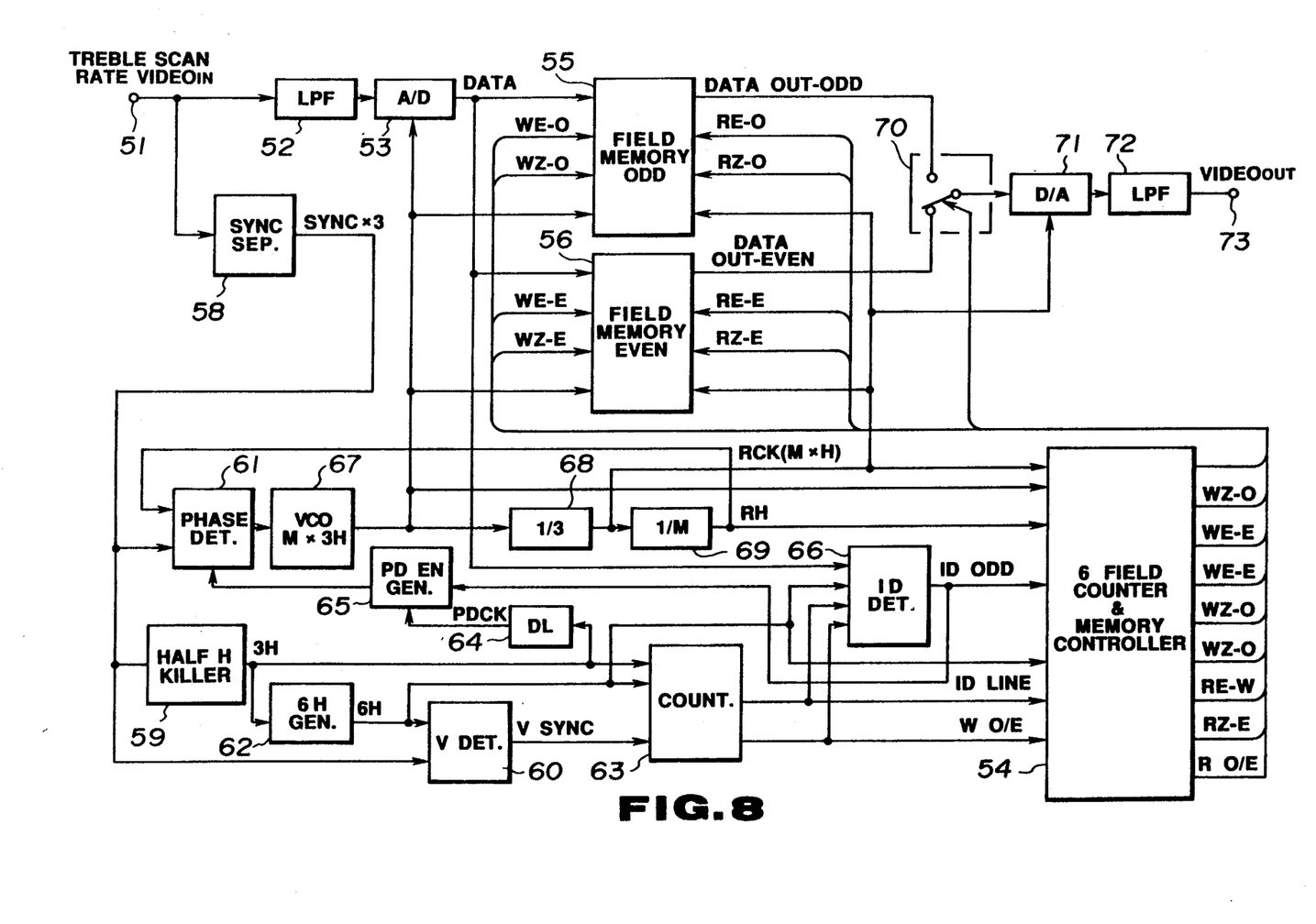
FIG. 8 is a block diagram showing an example of the configuration of a third embodiment of a scanning rate converter for a television signal according to this invention.

The scanning rate converter for a television signal shown in FIG. 8 is adapted for converting a treble scanning rate television signal obtained as an image pickup output by a television camera of the treble scanning rate to a scanning rate of the standard television system. The treble scanning rate television signal (VIDEO$_{IN}$) is delivered to signal input terminal 51.

Figure 9:
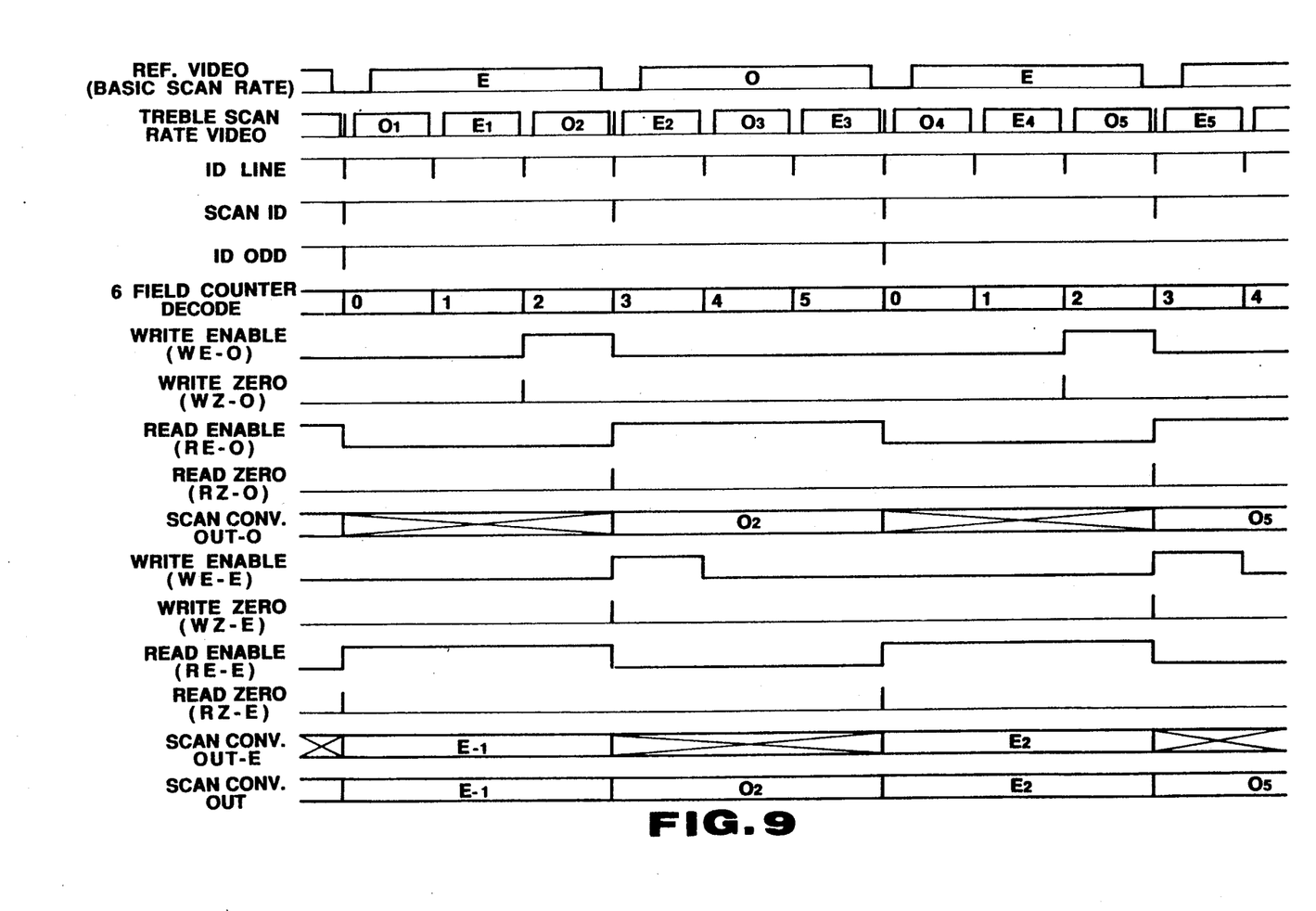
FIG. 9 is a timing chart showing the operation of the scanning rate converter shown in FIG. 8.
Figure 10:
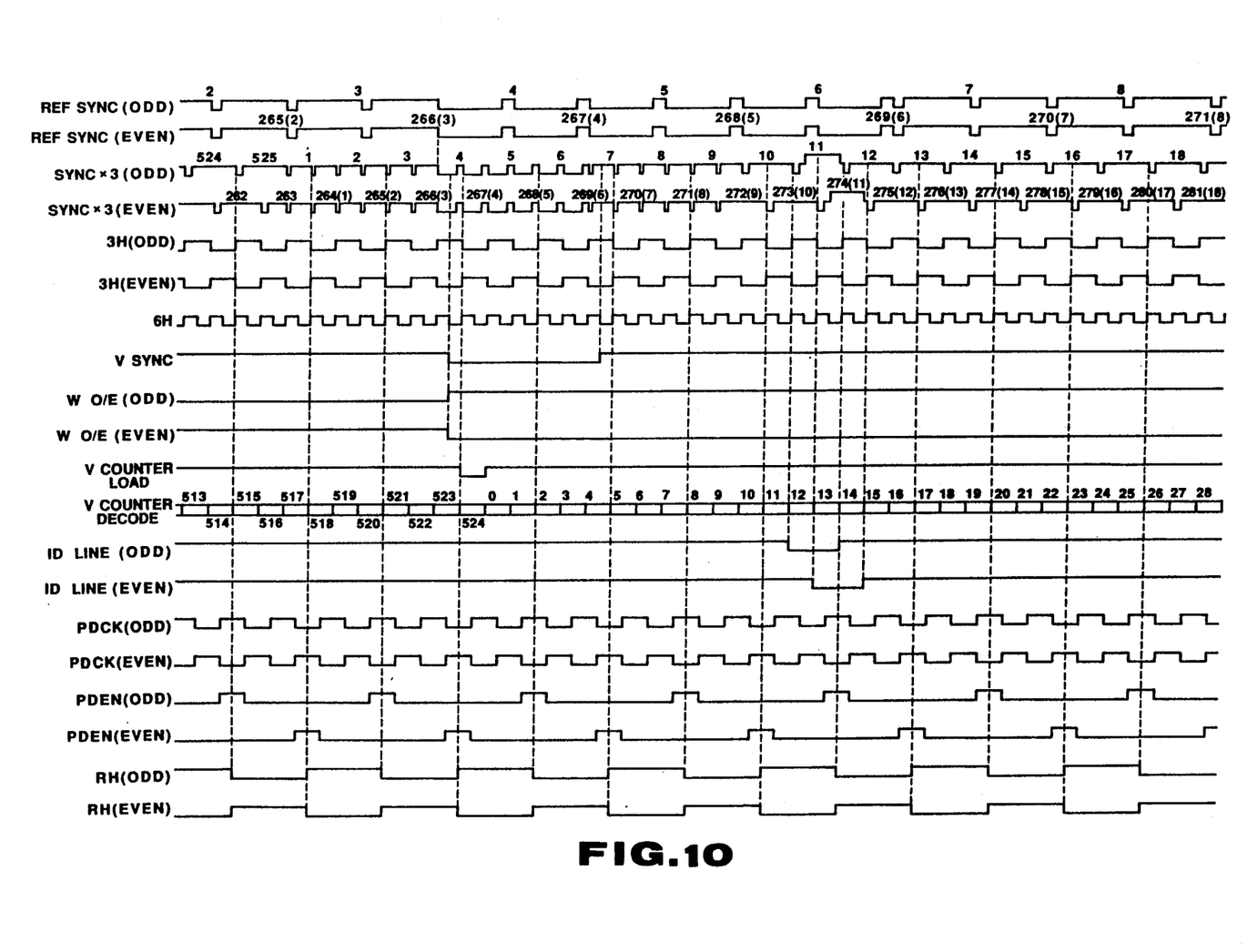
FIG. 10 is a timing chart showing the operation of a scanning rate converter of the NTSC system.
Figure 11:
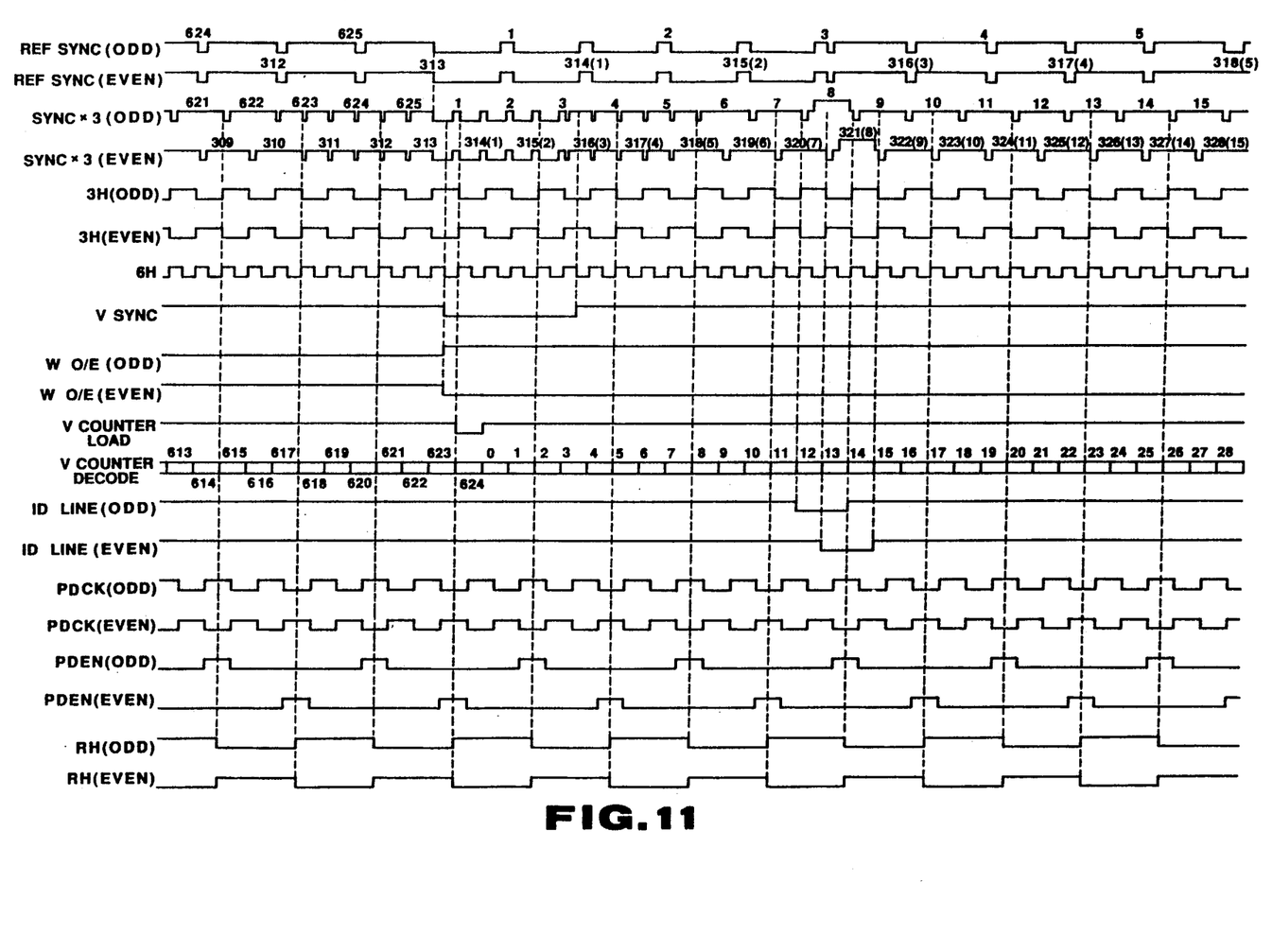
FIG. 11 is a timing chart showing the operation of a scanning rate converter of the PAL system.

In the treble scanning rate television signal (VIDEO$_{IN}$), as shown in FIG. 9, marker signals (SCAN ID) in which a specific line within a vertical blanking period is caused to be taken as a white level of 100% are inserted once every three fields. The inserting position of the marker signal (SCAN ID) is as follows. For example, in the case of the 525 line system such as the NTSC system, etc., the above marker signal is inserted, e.g., at the 11-th line of odd fields and the 274-th line of even fields as shown in FIG. 10. Further, in the case of the 625 line system such as the PAL system, etc. , the above marker signal is inserted at the 8-th line of odd fields and the 321-th line of even fields as shown in FIG. 11.

In this scanning rate converter, the treble scanning rate television signal (VIDEO$_{IN}$) supplied to the first signal input terminal 51 is delivered to an analog/digital (A/D) converter 53 through a low-pass filter 52 for preventing aliasing distortion, at which that signal is digitized. Data (DATA) of the treble scanning rate television signal digitized by the A/D converter 53 is written into a field memory 55 for odd fields and a field memory 56 for even fields subjected to a write control and a readout control of data by a memory controller 54.

Further, the treble scanning rate television signal (VIDEO$_{IN}$) supplied to the first signal input terminal 51 is delivered to a synchronous separation circuit 58, by which treble scanning rate synchronizing signal (SYNC×3) is extracted. The treble scanning rate synchronizing signal (SYNC×3) extracted by the synchronous separation circuit 58 is delivered to a half H killer circuit 59, a vertical synchronization detector 60, and a phase comparator 61.

The half H killer circuit 59 removes an equivalent pulse at the vertical synchronization portion of the treble scanning rate synchronizing signal (SYNC×3) to form a 3H pulse having a duty factor of substantially 50%. The 3H pulse obtained from the half H killer circuit 59 is delivered to a 6H pulse generator 62 and a V counter 63, and is also delivered to a comparative control signal generator 65 through a delay circuit 64.

The 6H pulse generator 62 forms a 6H pulse having a duty factor of substantially 50% with the phase of the 3H pulse as a reference. The 6H pulse obtained by the 6H pulse generator 62 is delivered to the memory controller 55, the vertical synchronization detector 60, a V counter 63, and is also delivered to a marker detector 66.

The vertical synchronization detector 60 latches the treble scanning rate synchronizing signal (SYNC×3) at a falling edge of the 6H pulse to thereby detect vertical synchronization to output a vertical synchronizing signal (VSYNC). The vertical synchronizing signal (VSYNC) obtained by the vertical synchronization detector 60 is delivered to the V counter 63.

The V counter 63 is a counter using the 6H pulse as a clock. This counter is reset by the phase of the vertical synchronization signal (VSYNC), and circulates when the count value reaches 525 or 625. The V counter 63 latches the 3H pulse at a falling edge of the vertical synchronizing signal (VSYSNC) to thereby detect odd fields and even fields of the treble scanning rate television signal (VIDEO$_{IN}$), thus to form a field discrimination pulse (WO/E). Further, this V counter 63 selects a count value of the 6H pulse to form a pulse (ID LINE) indicating the insertion line of the marker signal (ID). The field discrimination pulse (W O/E) and the marker insertion line pulse (ID LINE) are delivered to the memory controller 54 and the marker detector 66.

The marker detector 66 detects a marker insertion line of odd fields from the most significant bit (MSB) of data (DATA) of the treble scanning rate television signal digitized by the A/D converter 53, the field discrimination pulse W O/E and the marker insertion line pulse (ID LINE). Since the marker signal is constituted with white level of 100%, the most significant bit (MSB) of the data (DATA) represents logic "H". The marker detection pulse (ID ODD) by the marker detector 66 is delivered to the memory controller 54 and the comparative control signal generator 65.

Further, the 3H pulse obtained from the half H killer circuit 59 is delayed by means of the delay circuit 64 to such a phase to include the falling edge portion of HSYNC of the treble scanning rate synchronizing signal (SYNC×3) by logic "H", and is then delivered to the comparative control signal generator 65 as a clock pulse (PDCK).

The comparative control signal generator 65 frequency-divides the clock pulse (PDCK) by 3 to form a phase comparative control signal (PD EN) once every three lines with respect to a falling edge of (HSYNC) of the treble scanning rate synchronizing (SYNC×3). It is to be noted that the operation for frequency-dividing the clock pulse (PDCK) by 3 in the comparative control signal generator 65 is reset once every six fields by a marker detection pulse (ID ODD) by the marker detector 66. Thus, the phase is uniquely fixed.

The phase comparator 61 is supplied with a signal (RH) obtained by frequency-dividing an oscillation output of a voltage controlled oscillator (VCO) 67 by using frequency-dividers 68, 69, and carries out a phase comparison between this signal RH and the treble scanning rate synchronizing signal (SYNC×3) delivered from the synchronous separation circuit 58 to control an oscillation phase of the VCO 67 by that phase comparison output. Here, the phase comparator 61, the VCO 67, and the frequency-dividers 68 and 69 constitute a Phase Locked Loop (PLL).

In the PLL of such a structure, the phase comparison is limited to a specific HSYNC once every three lines of the treble scanning rate synchronizing signal (SYNC×3), and it is therefore possible to uniquely determine the phase of the signal RH, i.e., the H phase of the scanning rate converted output.

The VCO 67 oscillates at a frequency of $3 \times M \times f_H$ where M represents the number of samples within one horizontal scanning period of the treble scanning rate television signall (VIDEO$_{IN}$) and $f_H$ represents a horizontal scanning frequency. The frequency divider 68 frequency-divides an oscillation output of the VCO 67 by 3, and the frequency-divider 69 further frequency-divides a frequency-divided output of the frequency-divider 68 by M. The oscillation output of the VCO 17 is phase-locked to the treble scanning rate synchronizing signal SYNC×3 by the operation of the PLL. The oscillation output having the frequency of $3 \times M \times f_H$ by the VCO 67 is delivered, as a write clock WCK (M×3H), to the A/D converter 53, the memory controller 54, and respective field memories 55, 56. Further, a frequency-divided output of the frequency-divider 68 for frequency-dividing the write clock pulse WCK (M×3H) by 3 is delivered, as a readout clock RCK (M×H), to the memory controller 54 and the respective field memories 55, 56.

Here, as the number of samples within one horizontal scanning period of the treble scanning rate television signal, 858 is adopted in the case of the NTSC system, and 864 is adopted in the case of the PAL system.

The memory controller 54 forms various control pulses (WE-0, WE-E, WZ-0, WZ-E) for write control and various control pulses (RE-0, RE-E, RZ-0, RZ-E R O/E) for readout control of the respective field memories 55, 56, as shown in FIG. 9, on the basis of WCK (M×3H), RCK (M×H), RH, ID ODD, ID LINE, W O/E, etc. thus to control the respective field memories 55, 56.

The write enable pulses (WE-0, WE-E) of the various control pulses (WE-0, WE-E, WZ-0, WZ-E) for write control carry out a write operation of data for a time period of logic "H". The write enable pulse (WE-0) is placed in the state of logic "H" for a time period corresponding to odd fields (O$_2$, O$_5$, ...) of the treble scanning rate television signal (VIDEO) existing at the terminating end sides of respective even fields E of the reference television signal (REF. VIDEO). Further, the write enable pulse (WE-E) is placed in the state of logic "H" for a time period corresponding to even fields ($E_2$, $E_5$, $E_8$ ... ) of the treble scanning rate television signal (VIDEO) existing at the initial end sides of respective odd fields E of the reference television signal (REF. VIDEO). In addition, write zero pulses (WZ-0, WZ-E) of the various control pulses (WE-0, WE-E, WZ-0, WZ-E) for write control indicate the leading positions of write addresses of respective data written by the write enable pulses (WE-0, WE-E).

Further, the read enable pulses (RE-0, RE-E) of the various control pulses (RE-0, RE-E, RZ-0, RZ-E, R O/E) for readout control carry out readout of data for a time period of logic "H". The read enable pulse (RE-0) is placed in the state of logic "H" for a time period corresponding to respective odd fields 0 of the reference television signal (REF. VIDEO). Further, the read enable pulse (RE-E) is placed in the state of logic "H" for a time period corresponding to respective even fields of the reference television signal (REF. VIDEO). Furthermore, the read zero pulses (RZ-0, RZ-E) of the various control pulses (RE-0, RE-E, RZ-0, RZ-E, R O/E) for readout control indicate the leading positions of readout addresses of respective data read out by the read enable pulses (RE-0, RE-E). In addition, the readout clock (R O/E) of the various control pulses (RE-0, RE-E, RZ-0, RZ-E, R O/E) for readout control designate odd fields and even fields on the readout side, and are used as a control signal for a changeover switch 70.

Data write/read operation of the field memory 55 for odd fields is as follows. Under a write control and a readout control of data carried out by the control pulses (WE-0, WZ-0) for write control and the control pulses (RE-0, RZ-0) for readout control, data of odd fields ($O_2$, $O_5$ ... ) of the treble scanning rate television signal (VIDEO) existing at the terminating end sides of respective even fields E of the reference television signal (REF. VIDEO) are written into the field memory 55, and data of these odd fields ($O_2$, $O_5$ ... ) are read out from the field memory 55 with the time base being expanded for a time period of respective odd fields 0 of the reference television signal (REF. VIDEO). The data thus read out are delivered as scanning rate converted odd field data (CONV. OUT$_{ODD}$) to the digital-/analog (D/A) converter 71 through the changeover switch 70.

Further, data write/read operation of the field memory 56 for even fields is as follows. Under a write control and a readout control of data carried out by the control pulses (WE-E, WZ-E) for write control and the control pulses (RE-E, RZ-E) for readout control, data of even fields ($E_2$, $E_5$ ... ) of the treble scanning rate television signal (VIDEO) existing at the initial end sides of respective odd fields (0) of the reference television signal (REF. VIDEO) are written into the field memory 56, and data of these even fields ($E_2$, $E_5$ ... ) are read out from the field memory 56 with the time base being expanded for a time period of respective even fields E of the reference television signal (REF. VIDEO). The data thus read out are delivered as scanning rate converted even field data (CONV. OUT$_{EVEN}$) to the D/A converter 71 through the changeover switch 70.

The D/A converter 71 converts scanning rate converted odd field data (CONV. OUT$_{ODD}$) and even field data (CONV. OUT$_{EVEN}$) sequentially delivered through the changeover switch 70 to data in an analog form to output a scanning rate converted television signal (VIDEO$_{OUT}$) from output terminal 73 through an interpolating low-pass filter 72.

Since the scanning rate converted television signal (VIDEO$_{OUT}$) obtained at the output terminal 73 is a signal obtained by expanding the time base of data of successive two fields ($O_2$, $E_2$, $O_5$, $E_5$ ...) of the treble scanning rate television signal (VIDEO), data of odd fields and data of even fields constituting respective frames are successive in time, resulting in no possibility that the contour of a moving picture takes a form of stair-steps.

As stated above, in the scanning rate converter for television signal according to the third embodiment of this invention, an approach is employed to generate, on the basis of a marker signal generated at a period of the standard television signal inserted in a television signal having a scanning rate odd number (N) time greater than that of the standard television signal, a television signal having a scanning rate equal to the standard television signal scanning rate. Thus, it is possible to form a television signal synchronous with the marker signal by carrying out scanning rate conversion without providing an input terminal for the standard television signal for external synchronization. Accordingly, since the number of external connections can be reduced by one, the entire connection can be simplified.

What is claimed is:

1. Apparatus for converting a high speed television signal to a reference scanning frequency, said reference scanning frequency defining reference odd and even field intervals, said high speed television signal including odd and even fields and having a scanning frequency N times greater than said reference scanning frequency, where N is an odd integer, comprising:

first memory means for storing a first plurality of consecutive odd fields of said high speed television signal in accordance with first write signals and for reading out the stored first plurality of odd fields in accordance with a first read signal;

second memory means for storing a second plurality of consecutive even fields of said high speed television signal in accordance with second write signals and for reading out the stored second plurality of even fields in accordance with a second read signal;

means for producing a mean odd field by obtaining an arithmetical mean of said stored first plurality of odd fields and for producing a mean even field by obtaining an arithmetical mean of said stored second plurality of even fields; and control means for generating said first write signals and said second read signal during the reference even field interval to omit storage of even fields of said high speed television signal during said reference even field interval, and for generating said second write signals and said first read signal during the reference odd field interval to omit storage of odd fields of said high speed television signal during said reference odd field interval.

2. Apparatus for converting a high speed television signal to a reference scanning frequency, said reference scanning frequency defining reference field intervals, said high speed television signal including odd and even fields and having a scanning frequency N times greater than said reference scanning frequency, where N is an odd integer, comprising:

first memory means for storing an odd field of said high speed television signal in accordance with a first write signal and for reading out the stored odd field in accordance with a first read signal;

second memory means for storing an even field of said high speed television signal in accordance with a second write signal and for reading out the stored even field in accordance with a second read signal; and control means for generating one of said first and second write signals during a terminating 1/N interval of a first reference field interval, for generating the other of said first and second write signals during an initial 1/N interval of a second reference field interval, for generating one of said first and second read signals during said second reference field interval, and for generating the other of said first and second read signals during a third reference field interval.

3. Apparatus for converting a scanning rate of a television signal including fields, a marker signal at a standard scanning rate, and having a scanning rate N times greater than said standard scanning rate, where N is an integer, comprising:

memory means for storing at least one field of said television signal in accordance with a write signal and for reading out the stored at least one field at said standard scanning rate in accordance with a read signal;

means for detecting said marker signal; and control means for generating said write and read signals as a function of the detection of said marker signal.

4. An apparatus as set forth in claim 3, wherein said marker signal has a white level of 100%.

5. An apparatus as set forth in claim 3, wherein said marker signal is inserted at a position corresponding to a vertical retrace interval of a television signal having said standard scanning rate.

6. An apparatus as set forth in claim 3, wherein N is equal to 3.

* * * * *